(12) United States Patent
Cheung et al.

(10) Patent No.: US 12,025,440 B2
(45) Date of Patent: Jul. 2, 2024

(54) MULTI-DIRECTIONAL PHOTOGRAMMETRY TARGET

(71) Applicant: Rohr, Inc., Chula Vista, CA (US)

(72) Inventors: Charlene Cheung, San Diego, CA (US); Larry W. Brannock, San Diego, CA (US); Nicholas A. Leitch, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 442 days.

(21) Appl. No.: 17/307,265

(22) Filed: May 4, 2021

(65) Prior Publication Data

US 2021/0348921 A1 Nov. 11, 2021

Related U.S. Application Data

(60) Provisional application No. 63/020,242, filed on May 5, 2020.

(51) Int. Cl.
*G01C 11/02* (2006.01)
*G02B 5/136* (2006.01)

(52) U.S. Cl.
CPC ............. *G01C 11/02* (2013.01); *G02B 5/136* (2013.01)

(58) Field of Classification Search
CPC ........ G01C 11/00; G01C 11/02; G01C 15/05; G02B 5/136
See application file for complete search history.

(56) References Cited

U.S. PATENT DOCUMENTS

| 4,208,097 | A | * | 6/1980 | Yorgensen | ............ G01S 7/481 356/3 |
|---|---|---|---|---|---|
| 7,587,258 | B2 | | 9/2009 | Marsh | |
| 8,094,321 | B2 | | 1/2012 | Lee | |
| 8,509,949 | B2 | | 8/2013 | Bordyn | |
| 2003/0038933 | A1 | | 2/2003 | Shirley | |
| 2007/0153297 | A1 | | 7/2007 | Lau | |

FOREIGN PATENT DOCUMENTS

| CN | 106323335 A | * | 1/2017 | ............ G01C 25/00 |
|---|---|---|---|---|
| CN | 110440760 A | | 11/2019 | |
| CN | 210426541 U | | 4/2020 | |

OTHER PUBLICATIONS

EP search report for EP21172233.5 dated Oct. 6, 2021.

* cited by examiner

*Primary Examiner* — Peter B Kim
(74) *Attorney, Agent, or Firm* — Getz Balich LLC (57) ABSTRACT

A photogrammetry target includes a base including a first base side, configured to be fixedly mounted directly to a surface of a component, and a convex second base side opposite the first base side. The convex second base side is defined by a dome. The photogrammetry target further includes a plurality of retroreflective targets fixedly mounted to the dome. Each retroreflective target of the plurality of retroreflective targets includes a retroreflective surface facing a direction which is different than each other retroreflective surface of the plurality of retroreflective targets.

11 Claims, 6 Drawing Sheets

MULTI-DIRECTIONAL PHOTOGRAMMETRY TARGET

This application claims priority to U.S. Patent Appln. No. 63/020,242 filed May 5, 2020, which is hereby incorporated herein by reference in its entirety.

BACKGROUND

1. Technical Field

This disclosure relates generally to component inspection systems and methods, more particularly, systems and methods for photogrammetric inspection of components.

2. Background Information

Photogrammetric inspection of components can be an effective method for non-contact analysis of component dimensions to determine manufacturing acceptability. One example of photogrammetry is the extraction of three-dimensional measurements of a component from two-dimensional image data, where the scale of the image is known. Photogrammetric inspections may require a line of sight between imaging devices and targets placed on or around the component being inspected. To accommodate this line-of-sight requirement, conventional targets come in forms configured to be rotated or otherwise repositioned so that they are visible at different angles as required for an inspection of the entire component. Thus, inspection of an entire component requires repositioning the targets multiple times throughout an inspection, increasing the required completion time. Conventional targets also require at least two operators for a photogrammetric inspection: one operator to operate the imaging device and associated equipment and at least one additional operator to reposition and/or rotate the targets. Additionally, conventional targets, configured with a number of movable parts necessary for adjustment of the target position, can be expensive. Accordingly, what is needed is an improved photogrammetric target which addresses one or more of the above-discussed concerns.

SUMMARY

It should be understood that any or all of the features or embodiments described herein can be used or combined in any combination with each and every other feature or embodiment described herein unless expressly noted otherwise.

According to an embodiment of the present disclosure, a photogrammetry target includes a base including a first base side, configured to be fixedly mounted directly to a surface of a component, and a convex second base side opposite the first base side. The convex second base side is defined by a dome. The photogrammetry target further includes a plurality of retroreflective targets fixedly mounted to the dome. Each retroreflective target of the plurality of retroreflective targets includes a retroreflective surface facing a direction which is different than each other retroreflective surface of the plurality of retroreflective targets.

In the alternative or additionally thereto, in the foregoing embodiment, the base is defined about an axial centerline and the plurality of retroreflective targets includes a center retroreflective target centered about the axial centerline. The retroreflective surface of the center retroreflective target faces in an axial direction.

In the alternative or additionally thereto, in the foregoing embodiment, the plurality of retroreflective targets further includes a circumferential arrangement of retroreflective targets disposed about the center retroreflective target with respect to the axial centerline.

In the alternative or additionally thereto, in the foregoing embodiment, each retroreflective target of the circumferential arrangement of retroreflective targets is oriented at a same angle relative to the axial centerline.

In the alternative or additionally thereto, in the foregoing embodiment, the angle is between 10 degrees and 60 degrees, inclusive.

In the alternative or additionally thereto, in the foregoing embodiment, the dome includes a plurality of mount portions. Each mount portion includes a recess into which a respective retroreflector of the plurality of retroreflectors is disposed.

In the alternative or additionally thereto, in the foregoing embodiment, the photogrammetry target further includes a cap configured to engage with the base and cover the plurality of retroreflectors.

According to another embodiment of the present disclosure, a photogrammetry system includes a component including a surface. The photogrammetry system further includes a plurality of photogrammetry targets mounted to the surface of the component. Each photogrammetry target of the plurality of photogrammetry targets includes a base including a first base side, fixedly mounted directly to the surface of the component, and a convex second base side opposite the first base side. The convex second base side is defined by a dome. Each photogrammetry target of the plurality of photogrammetry targets further includes a plurality of retroreflective targets fixedly mounted to the dome. Each retroreflective target of the plurality of retroreflective targets includes a retroreflective surface facing a direction which is different than each other retroreflective surface of the plurality of retroreflective targets.

In the alternative or additionally thereto, in the foregoing embodiment, the photogrammetry system further includes an imaging device positioned to direct light from a light source to one or more photogrammetry targets of the plurality of photogrammetry targets and receive a reflected light form the one or more photogrammetry targets.

In the alternative or additionally thereto, in the foregoing embodiment, the base is defined about an axial centerline and the plurality of retroreflective targets includes a center retroreflective target centered about the axial centerline and facing in an axial direction.

In the alternative or additionally thereto, in the foregoing embodiment, the plurality of retroreflective targets further includes a circumferential arrangement of retroreflective targets disposed about the center retroreflective target with respect to the axial centerline.

In the alternative or additionally thereto, in the foregoing embodiment, each retroreflective target of the circumferential arrangement of retroreflective targets is oriented at a same angle relative to the axial centerline.

In the alternative or additionally thereto, in the foregoing embodiment, each retroreflective target is positionally fixed relative to the component.

In the alternative or additionally thereto, in the foregoing embodiment, the base further includes at least one mounting aperture extending through the first base side.

According to another embodiment of the present disclosure, a method for making a photogrammetry target includes additively manufacturing a base including a first base side, configured to be fixedly mounted directly to a surface of a component, and a convex second base side opposite the first base side, the convex second base side defined by a dome. The method further including fixedly mounting a plurality of retroreflective targets to the dome. Each retroreflective target of the plurality of retroreflective targets includes a retroreflective surface facing a direction which is different than each other retroreflective surface of the plurality of retroreflective targets.

In the alternative or additionally thereto, in the foregoing embodiment, the base is defined about an axial centerline and the plurality of retroreflective targets includes a center retroreflective target centered about the axial centerline and facing in an axial direction.

In the alternative or additionally thereto, in the foregoing embodiment, the plurality of retroreflective targets further includes a circumferential arrangement of retroreflective targets disposed about the center retroreflective target with respect to the axial centerline.

In the alternative or additionally thereto, in the foregoing embodiment, each retroreflective target of the circumferential arrangement of retroreflective targets is oriented at a same angle relative to the axial centerline.

In the alternative or additionally thereto, in the foregoing embodiment, the dome includes a plurality of mount portions. Each mount portion includes a recess into which a respective retroreflector of the plurality of retroreflectors is disposed.

In the alternative or additionally thereto, in the foregoing embodiment, the base further includes at least one mounting aperture extending through the first base side.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIGS. 1-6, a photogrammetry target 10, according to embodiments of the present disclosure, is provided for measuring one or more dimensions of a component, for example, the component 100, with an imaging device 200. The photogrammetry target 10 includes a base 12 defined about an axial centerline 14. The base 12 includes a first side 16 configured to be fixedly mounted directly to a surface 102 of the component 100 to be measured. The base 10 further includes a second side 18 opposite the first side 16. The base 12 may have, for example, a circular cross-sectional shape or any other size and/or shape necessary for a particular photogrammetry application.

The second side 18 of the base 12 is defined by a dome 20. A center portion 22 of the dome 20 is located at the axial centerline 14 and may represent an axially distal portion of the dome 20 with respect to the first side 16 of the base 12. A peripheral portion 24 of the dome 20 is located along a radially exterior perimeter of the dome 20 and may represent an axially proximate portion of the dome 20 with respect to the first side 16 of the base. The dome 20 may define a convex curve between the peripheral portion 24 and the center portion 22 of the dome 20. The first and second sides 16, 18 of the base 12 are connected by a sidewall 26 which extends generally axially between first and second sides 16, 18 and forms a radial perimeter of the base 12.

The photogrammetry target 10 includes a plurality of retroreflective targets 28 mounted to the dome 20. Each retroreflective target of the plurality of retroreflective targets 28 includes a retroreflective surface 30 facing away from the dome 20. In various embodiments, the dome 20 may include a plurality of mount portions 32 with each mount portion of the plurality of mount portions 32 including a recess 34. The plurality of retroreflective targets 28 may each be disposed in a respective recess 34. In various embodiments, the mount portions 32 may have a hexagonal shape with sides 35 of the mount portions 32 aligned with the sides 35 of adjacent mount portions 32. However, it should be understood that the mount portions 32 may have any suitable shape. Further, while the photogrammetry target 10 is illustrated with 7 retroreflective targets 28, it should be understood that any suitable number of retroreflective targets 28 may be used.

In various embodiments, each retroreflective surface 30 of the plurality of retroreflective targets 28 may face a direction D (e.g., a direction perpendicular to the retroreflective surface 30 of the respective retroreflective target 28) which is different than each other retroreflective surface 30 of the plurality of retroreflective targets 28. The plurality of retroreflective targets 28 may include a center retroreflective target 36 centered about the axial centerline 14 and having a retroreflective surface 30 facing in an axial direction (e.g., facing in a direction which is parallel to the axial centerline 14). The plurality of retroreflective targets 28 may further include a circumferential arrangement of retroreflective targets 38 disposed about the center retroreflective target 36 and/or the axial centerline 14.

Figure 4:
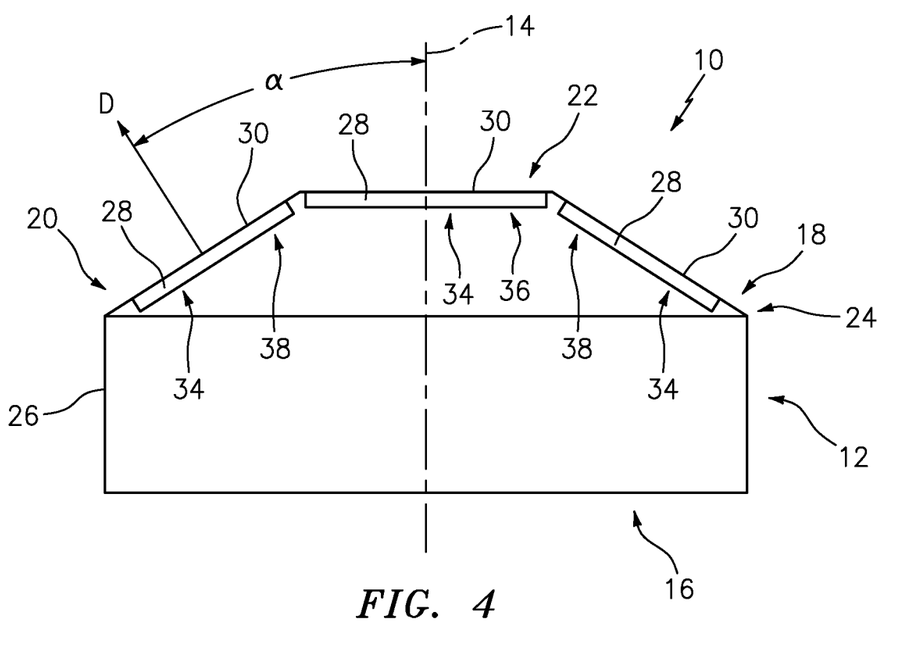
FIG. 4 illustrates a cross-sectional view of the photogrammetric target of FIG. 1. taken along Line 4-4, in accordance with one or more embodiments of the present disclosure.

As shown, for example, in FIG. 4, each retroreflective target of the circumferential arrangement of retroreflective targets 38 may be oriented at an angle α relative to the axial centerline 14 (e.g., an angle defined between the axial centerline 14 and a direction in which the retroreflective surface of the respective retroreflective target faces). The angle α may be any suitable angle for maintaining the imaging device 200 and at least one of the plurality of retroreflective targets 28 at an optimal angle of acceptance (e.g., +/−30 degrees). For example, in various embodiments, the angle α may be between 0 degrees and 60 degrees, inclusive. In various embodiments, each retroreflective target of the circumferential arrangement of retroreflective targets 38 may be oriented at a same angle α relative to the axial centerline 14.

Figure 3:
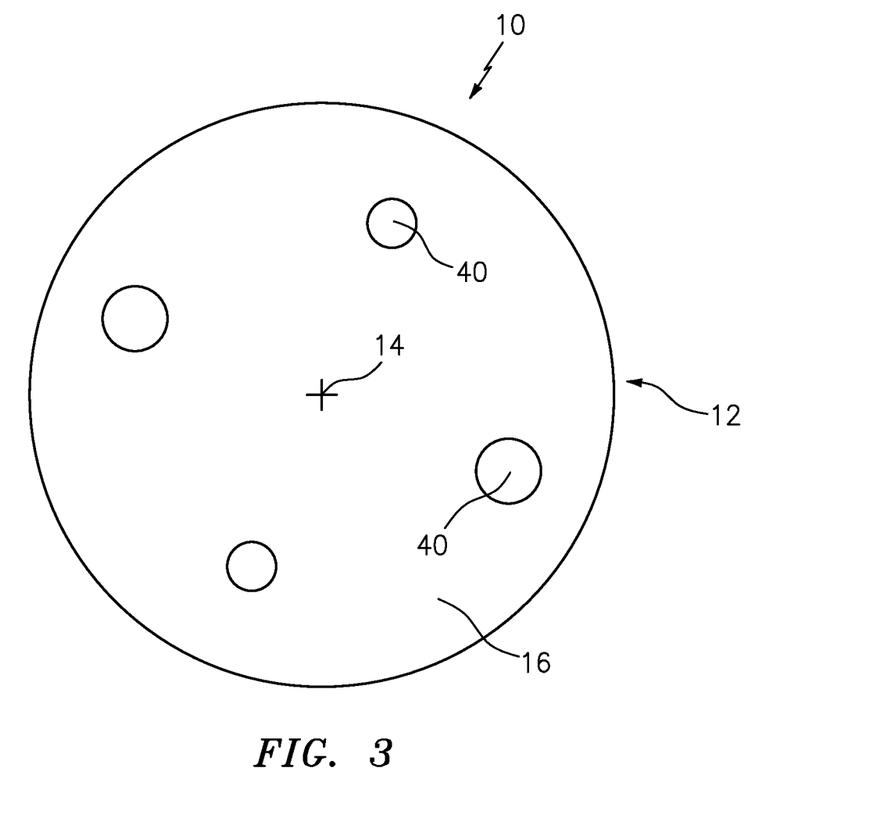
FIG. 3 illustrates a bottom view of the photogrammetric target of FIG. 1, in accordance with one or more embodiments of the present disclosure.

As shown in FIG. 3, the first side 16 of the base 12 may include at least one mounting aperture 40 for mounting the photogrammetric target 10 to the surface 102 of the component 100. Accordingly, the base 12 may be mounted to the surface 102 of the component 100 with at least one fastener (not shown) extending through the at least one mounting aperture 40. In various other embodiments, alternative means for mounting the first side 16 of the base 12 to the surface 102 of the component 100 may be used, for example, adhesives, magnets, etc.

Figure 1:
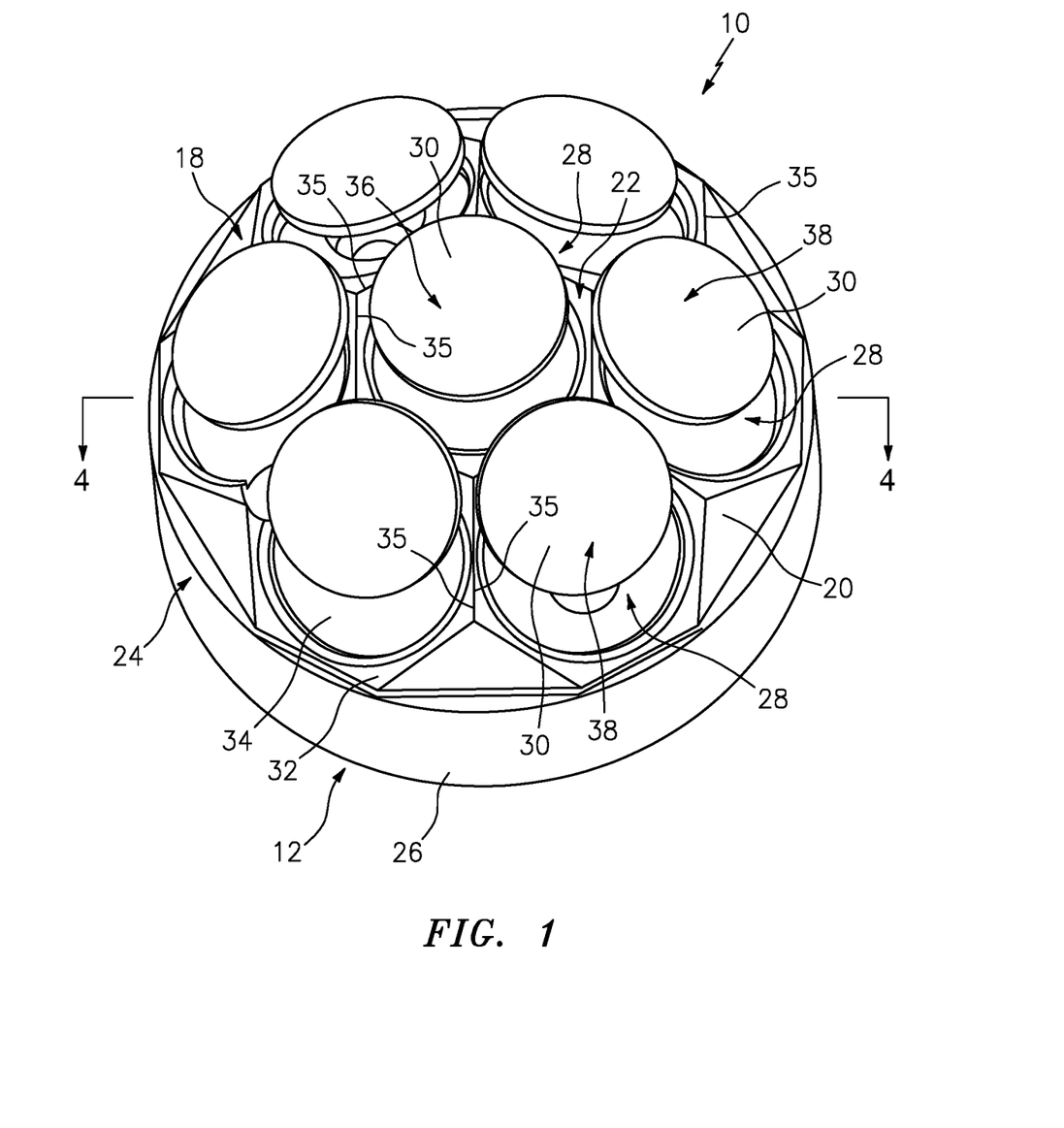
FIG. 1 illustrates a perspective, exploded view of a photogrammetric target, in accordance with one or more embodiments of the present disclosure.
Figure 2:
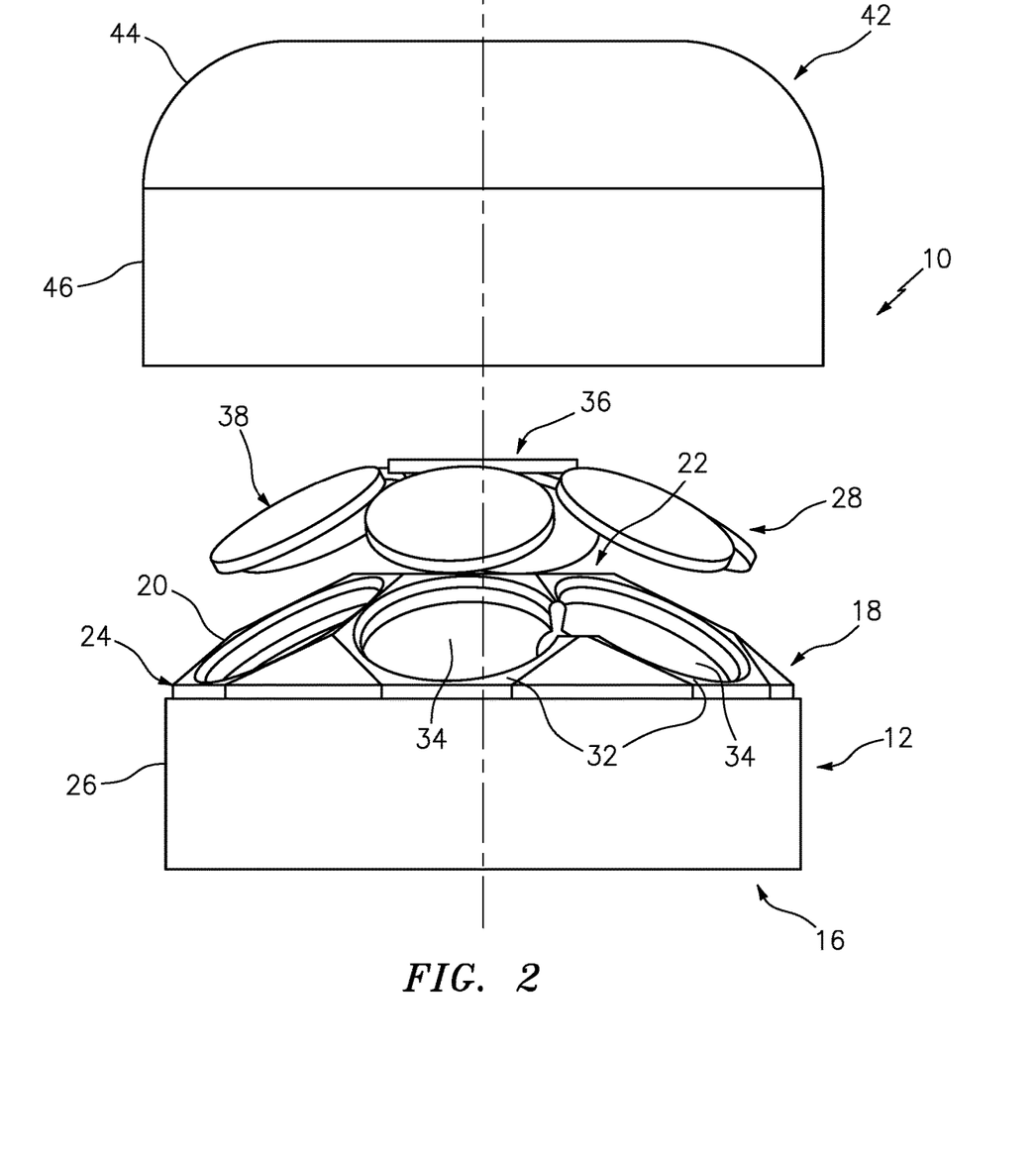
FIG. 2 illustrates a side, exploded view of the photogrammetric target of FIG. 1, in accordance with one or more embodiments of the present disclosure.

In various embodiments, the photogrammetry target 10 may include a cap 42 configured to surround the second side 18 of the base 12 so as to cover and protect the plurality of retroreflective targets 28. The cap 42 may include a cover portion 44 and an annular side portion 46. The side portion 46 may be configured to tightly engage with the sidewall 26 of the base 12 so as to maintain the cap 42 in position with respect to the base 12 when installed on the base 12. In various embodiments, the side portion 46 and the sidewall 26 may include threads for threaded engagement between the side portion 46 and the sidewall 26.

In various embodiments, the base 12 may be a single, monolithic (e.g., integral) component. Because of the orientation of the plurality of retroreflective targets 28 about the dome 20, repositioning the photogrammetry target between images of a photogrammetric inspection may not be necessary. Unlike prior art photogrammetry targets, the photogrammetry target 10 does not require any movable/rotatable components for repositioning the photogrammetry target 10 relative to the imaging device 200. Accordingly, the base 12 of the photogrammetry device 10 may be quickly additively manufactured at a relatively low cost. In various embodiments, the base 12 may be formed from a plastic material (e.g., a thermoset or thermoplastic material). For example, in various embodiments, the base 12 may be formed from a nylon material which may include carbon fiber strands. In various embodiments, the material of the base 12 may be a low-reflectivity material in order to improve contrast between the base 12 and the plurality of retroreflective targets 28.

Figure 5:
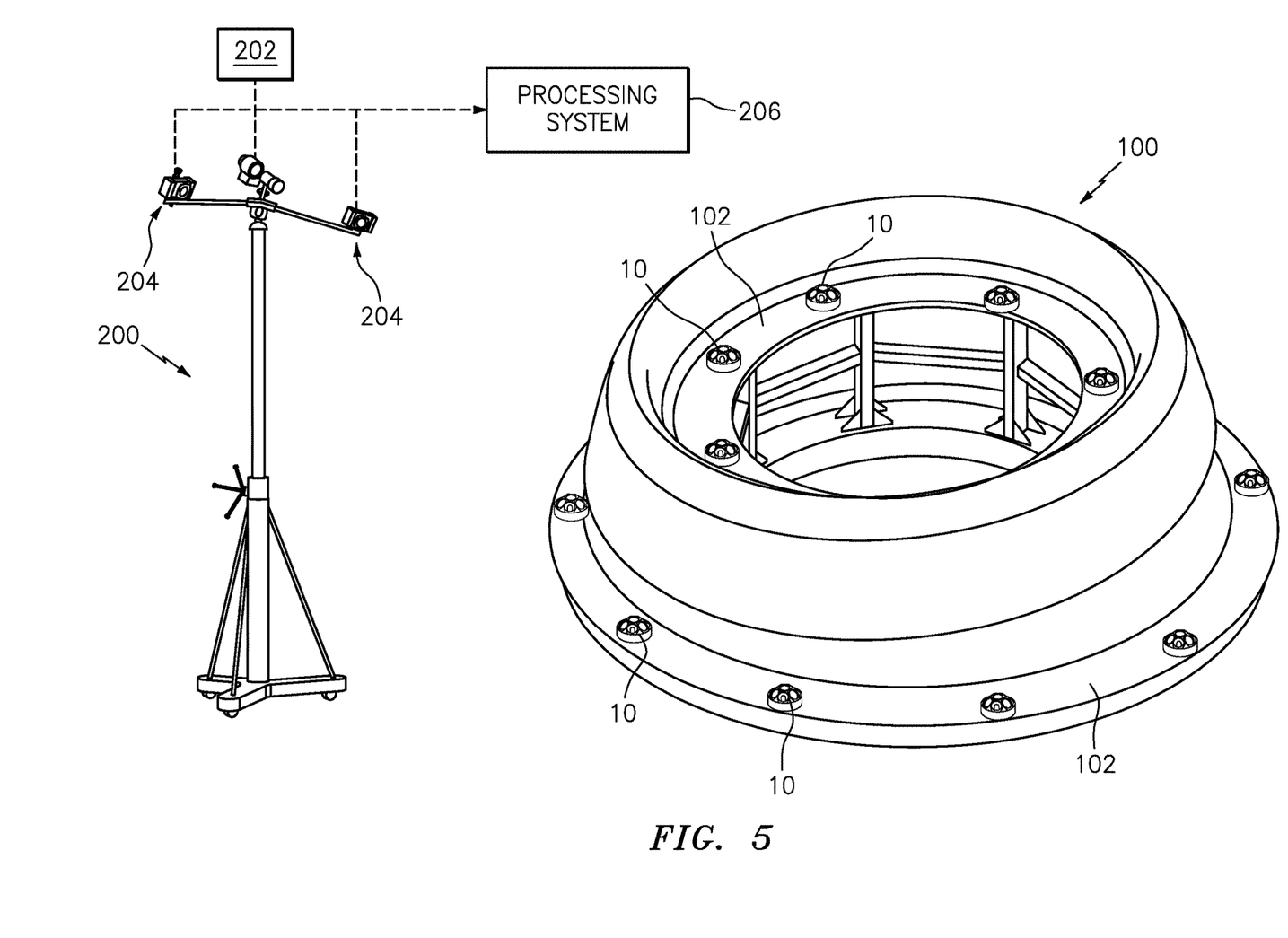
FIG. 5 illustrates an exemplary photogrammetric system including one or more of the photogrammetric targets of FIG. 1, in accordance with one or more embodiments of the present disclosure.
Figure 6:
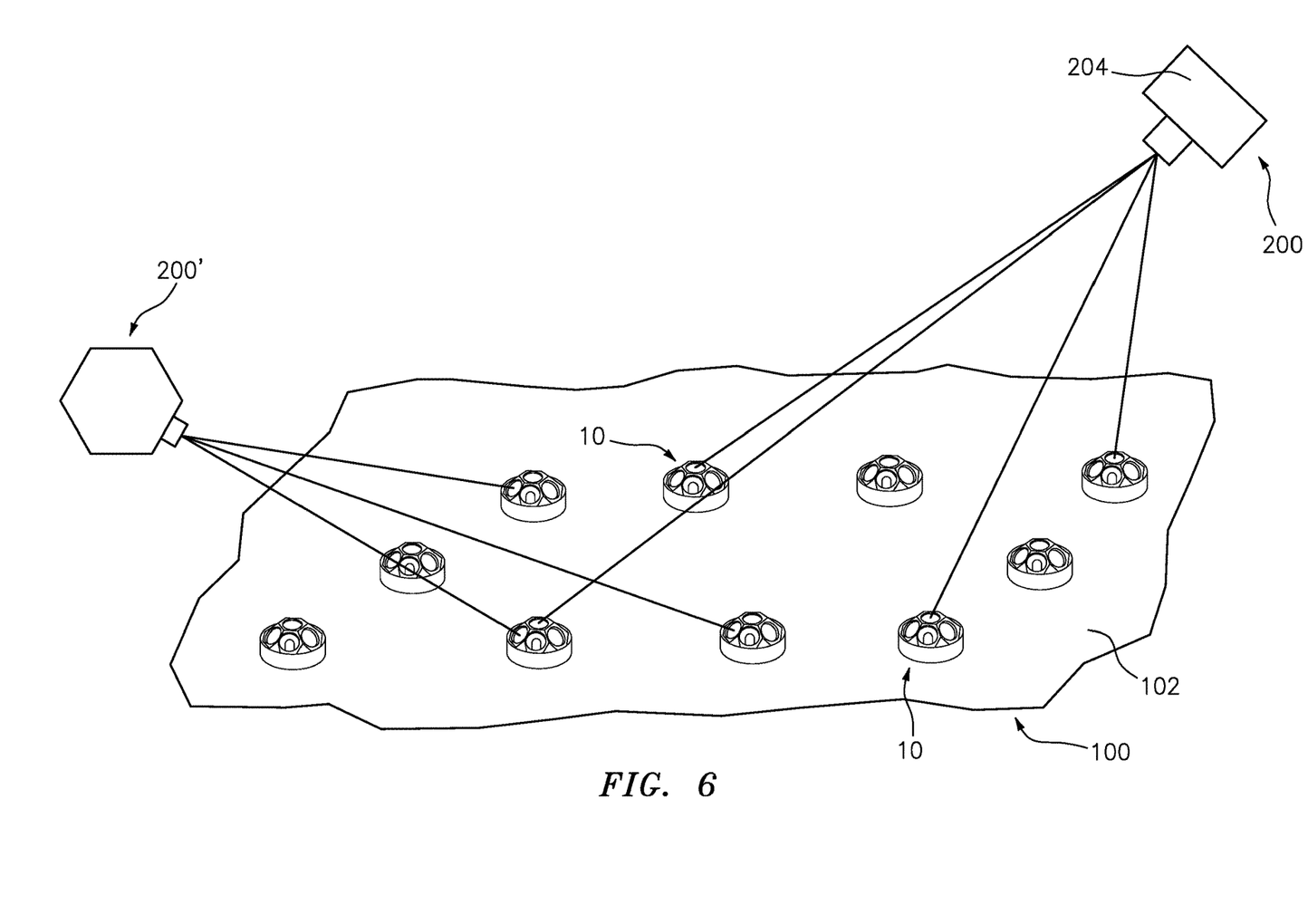
FIG. 6 illustrates an exemplary photogrammetric system including one or more of the photogrammetric targets of FIG. 1, in accordance with one or more embodiments of the present disclosure.

As shown in FIGS. 5 and 6, a plurality of the photogrammetry targets 10 may be mounted to the surface 102 of the component 100, at predetermined locations, during a non-contact photogrammetric inspection of the component 100. An imaging device 200 is positioned to direct light from a light source 202 to one or more of the plurality of the photogrammetry targets 10 and receive a reflected light from the one or more of the photogrammetry targets 10 with one or more optical cameras 204. Each of the optical cameras 204 is configured to capture image data of the light directed from the light source 202 and reflected by the retroreflective targets 28 of the photogrammetry targets 10. The imaging device 200 may be moved relative to the component 100 to obtain image data of the entire component 100 from a plurality of perspectives. As shown in FIG. 6, in various embodiments, an imaging device 200' may additionally or alternatively be used to obtain image data of the component 100. The imaging device 200' may be configured as, for example, a handheld or robotic scanner. The processing system 206 may process the image data from the imaging device 200 and/or the imaging device 200' with nominal data which is known/predetermined data representative of a design model for the component 100. By comparing the image data and nominal data, the processing system 206 may determine whether the measured dimensions of the component 100 are within or outside of tolerance.

The photogrammetry target 10, according to embodiments of the present disclosure, obviates the need to reposition or adjust photogrammetry targets as image data of components is obtained from multiple perspectives. Accordingly, cycle times required for a photogrammetric inspection may be reduced. Further, the photogrammetric target 10 may eliminate the need for personnel assigned to reposition/adjust photogrammetry targets during photogrammetric inspections. This may provide the additional advantage of reducing or eliminating technician-caused error as a result of improper placement and/or orientation of photogrammetry targets.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A photogrammetry target comprising:
 a base defined about an axial centerline, the base comprising a first base side, a convex second base side, and a sidewall, the first base side extending radially outward from the axial centerline and configured to be fixedly mounted directly to a surface of a component, the convex second base side disposed opposite the first base side, the convex second base side defined by a dome, the dome including a radially exterior perimeter, the sidewall forming a radial perimeter of the base, and the sidewall extending axially between and connecting the first base side and the convex second base side at the radially exterior perimeter;
 a plurality of retroreflective targets fixedly mounted to the dome, each retroreflective target of the plurality of retroreflective targets comprising a retroreflective surface facing a direction which is different than each other retroreflective surface of the plurality of retroreflective targets, the plurality of retroreflective targets comprising:
- a center retroreflective target centered about the axial centerline, the retroreflective surface of the center retroreflective target facing in an axial direction; and
- a circumferential arrangement of retroreflective targets disposed circumferentially about and radially-adjacent the center retroreflective target with respect to the axial centerline, each retroreflective target of the circumferential arrangement of retroreflective targets disposed radially between the center retroreflective target and the radially exterior perimeter, each retroreflective target of the circumferential arrangement of retroreflective targets oriented at a same angle relative to the axial centerline, and the angle is between 10 degrees and 60 degrees, inclusive.

2. The photogrammetry target of claim 1, wherein the dome comprises a plurality of mount portions, each mount portion comprising a recess into which a respective retroreflector of the plurality of retroreflectors is disposed.

3. The photogrammetry target of claim 1, further comprising a cap configured to engage with the base and cover the plurality of retroreflectors.

4. A photogrammetry system comprising:
- a component comprising a surface;
- a plurality of photogrammetry targets mounted to the surface of the component, each photogrammetry target of the plurality of photogrammetry target comprising:
  - a base defined about an axial centerline, the base comprising a first base side, a convex second base side, and a sidewall, the first base side extending radially outward from the axial centerline and configured to be fixedly mounted directly to a surface of a component, the convex second base side disposed opposite the first base side, the convex second base side defined by a dome, the sidewall forming a radial perimeter of the base, and the sidewall extending axially between and connecting the first base side and the convex second base side;
  - a plurality of retroreflective targets fixedly mounted to the dome, each retroreflective target of the plurality of retroreflective targets comprising a retroreflective surface facing a direction which is different than each other retroreflective surface of the plurality of retroreflective targets, the plurality of retroreflective targets comprising:
    - a center retroreflective target centered about the axial centerline, the retroreflective surface of the center retroreflective target facing in an axial direction; and
    - a circumferential arrangement of retroreflective targets disposed circumferentially about and radially-adjacent the center retroreflective target with respect to the axial centerline, each retroreflective target of the circumferential arrangement of retroreflective targets disposed radially between the center retroreflective target and the sidewall.

5. The photogrammetry system of claim 4, further comprising an imaging device positioned to direct light from a light source to one or more photogrammetry targets of the plurality of photogrammetry targets and receive a reflected light from the one or more photogrammetry targets.

6. The photogrammetry system of claim 4, wherein each retroreflective target of the circumferential arrangement of retroreflective targets is oriented at a same angle relative to the axial centerline.

7. The photogrammetry system of claim 4, wherein each retroreflective target is positionally fixed relative to the component.

8. The photogrammetry system of claim 4, wherein the base further comprises at least one mounting aperture extending through the first base side.

9. A method for making a photogrammetry target, the method comprising:
- additively manufacturing a base defined about an axial centerline, the base comprising a first base side, a convex second base side, and a sidewall, the first base side extending radially outward from the axial centerline and configured to be fixedly mounted directly to a surface of a component, the convex second base side disposed opposite the first base side, the convex second base side defined by a dome, the dome including a radially exterior perimeter, the sidewall forming a radial perimeter of the base, and the sidewall extending axially between and connecting the first base side and the convex second base side at the radially exterior perimeter;
- fixedly mounting a plurality of retroreflective targets to the dome, each retroreflective target of the plurality of retroreflective targets comprising a retroreflective surface facing a direction which is different than each other retroreflective surface of the plurality of retroreflective targets, the plurality of retroreflective targets comprising:
  - a center retroreflective target centered about the axial centerline, the retroreflective surface of the center retroreflective target facing in an axial direction; and
  - a circumferential arrangement of retroreflective targets disposed circumferentially about and radially-adjacent the center retroreflective target with respect to the axial centerline, each retroreflective target of the circumferential arrangement of retroreflective targets disposed radially between the center retroreflective target and the radially exterior perimeter, and each retroreflective target of the circumferential arrangement of retroreflective targets oriented at a same angle relative to the axial centerline.

10. The method of claim 9, wherein the dome comprises a plurality of mount portions, each mount portion comprising a recess into which a respective retroreflector of the plurality of retroreflectors is disposed.

11. The method of claim 9, wherein the base further comprises at least one mounting aperture extending through the first base side.

* * * * *